United States Patent [19]
Morris et al.

[11] Patent Number: 5,944,286
[45] Date of Patent: Aug. 31, 1999

[54] JOINT ASSEMBLIES

[75] Inventors: John S Morris; Robert J Maziarz, both of Bristol, United Kingdom

[73] Assignee: British Aerospace Public Limited Company, Hampshire, United Kingdom

[21] Appl. No.: 08/840,048

[22] Filed: Apr. 24, 1997

[30] Foreign Application Priority Data

Apr. 24, 1996 [GB] United Kingdom .................. 9608610

[51] Int. Cl.⁶ .............................. B64C 1/06; B64C 1/12; F16B 3/00
[52] U.S. Cl. .......................... 244/131; 244/123; 244/132; 403/335
[58] Field of Search .................................. 244/123, 131, 244/132, 133; 403/363, 335

[56] References Cited

U.S. PATENT DOCUMENTS

| | | | |
|---|---|---|---|
| 1,967,901 | 7/1934 | Ragsdale | 244/131 X |
| 2,367,750 | 1/1945 | Berkow et al. | 244/131 X |
| 2,382,358 | 8/1945 | Watter | 244/131 |
| 2,392,788 | 1/1946 | Watter | 244/131 X |
| 2,661,083 | 12/1953 | Henderson . | |
| 3,004,645 | 10/1961 | Moul, Jr. | 244/131 |
| 3,219,158 | 11/1965 | Carter et al. | 244/131 X |
| 3,920,206 | 11/1975 | Bigham et al. | 244/132 |
| 4,390,153 | 6/1983 | Wuermseer | 244/131 |
| 5,484,221 | 1/1996 | DeCoux | 244/131 X |

FOREIGN PATENT DOCUMENTS

| | | | |
|---|---|---|---|
| 564162 | 9/1958 | Canada | 403/363 |
| 245408 | 4/1926 | United Kingdom . | |
| 315792 | 10/1930 | United Kingdom . | |
| 507973 | 6/1939 | United Kingdom . | |
| 531357 | 1/1941 | United Kingdom . | |
| 905602 | 9/1962 | United Kingdom . | |
| 2260794 | 4/1993 | United Kingdom . | |

*Primary Examiner*—Charles T. Jordan
*Assistant Examiner*—Theresa M. Wesson
*Attorney, Agent, or Firm*—Nixon & Vanderhye P.C.

[57] ABSTRACT

A joint assembly and an aircraft wing assembly containing such a joint assembly are provided. Each joint assembly for connecting together a first member (1) and a second member (4) comprises a second channel member (5) affixed to the first member (1) having a first channel member (12) with sidewalls (15, 16) engageable with first and second elements (8, 9) of the second channel member. The second member (4) has a flange which engages a flat surface (14) of a base portion (13) thereof. The various elements are held together by bolts (19, 20, 23) and tolerance adjustment in both horizontal and vertical directions is provided by mutual sliding of the surfaces prior to drilling apertures for the bolts.

8 Claims, 1 Drawing Sheet

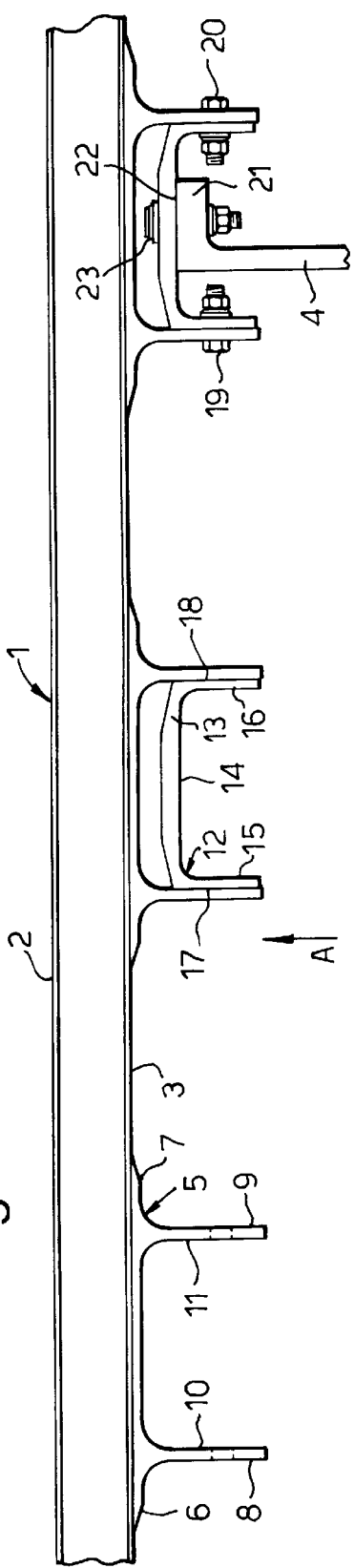
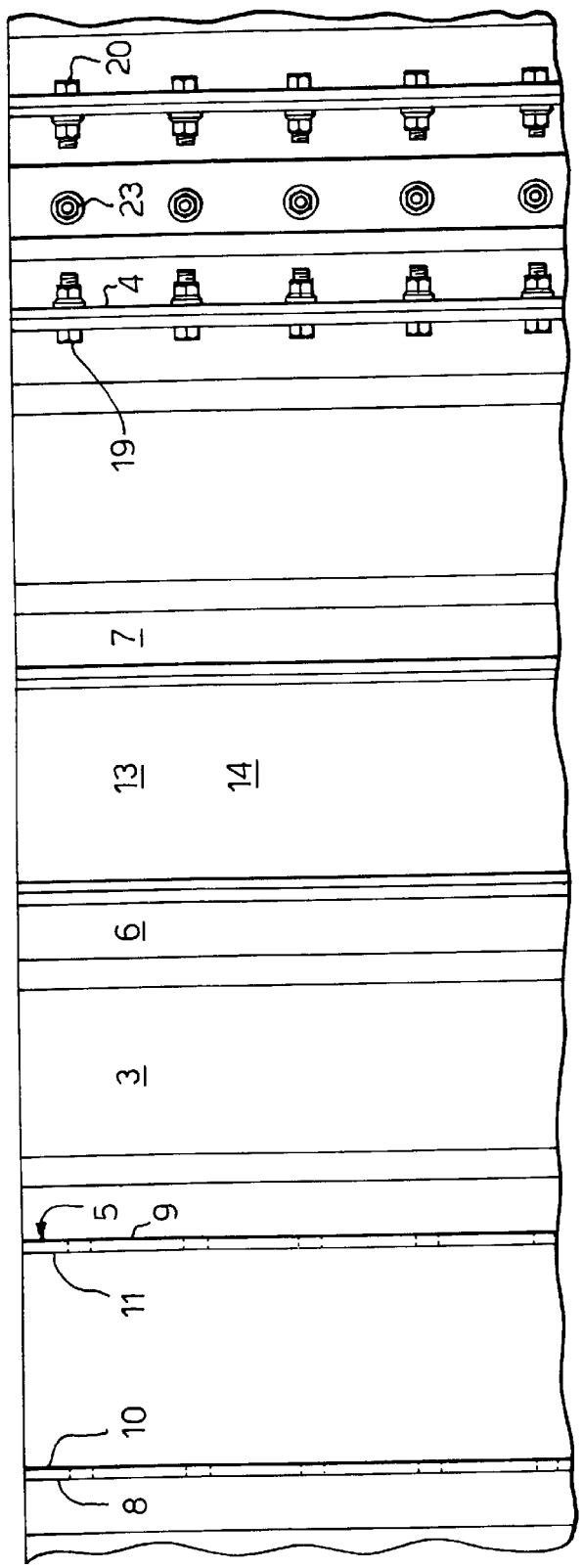

JOINT ASSEMBLIES

BACKGROUND TO THE INVENTION

1. Field of Invention

This invention relates to a joint assembly and more particularly to a joint assembly for use in an aircraft, most particularly in an aircraft wing.

2. Discussion of Prior Art

When two members are to be securely joined together in a relationship in which a surface of a first member is in abutting connection with an edge of a second member there is often scope for take-up of manufacturing tolerances. In particular tolerances measured both across the surface or in the plane of the first member and substantially perpendicularly thereto may need to be "absorbed" by the joint. Such joints have a tendency to be bulky and/or to require time consuming shimming during manufacture to take up the tolerances.

SUMMARY OF THE INVENTION

It is an object of the invention to provide an improved joint assembly.

According to a first aspect of the present invention there is provided a joint assembly for connecting together a first member and a second member extending at an angle to a first surface of the first member, the joint assembly including first and second elements each having one of a first pair of spaced oppositely facing and substantially flat surfaces and extending outwardly from the first surface at substantially the said angle, a channel member having a base portion and first and second sidewall portions, each sidewall portion including one of a second pair of oppositely facing surfaces adapted slideably to engage the first pair of surfaces, the base portion including a substantially flat surface facing away from the first surface in use and extending at right angles to the second pair of oppositely facing surfaces, and a substantially flat surface on the second member adapted slideably to engage the said surface of the base portion, the joint being secured by fastening means adapted rigidly to secure the said engagable surfaces together.

The provision of substantially flat surfaces in directions at right angles to one another thus provides adjustment for taking up tolerances both across the surface of the first member and at an angle made between the surface of the first member and the second member. In addition the use of the channel member provides stability to the joint and the potential for a compact arrangement thereof.

Preferably the first pair of spaced, oppositely facing and substantially flat surfaces on the first and second elements of the joint, respectively, face each other.

The channel member will thus lie between the first and second elements of the joint, making for a joint of more compact dimensions measured laterally across the surface of the first member. In addition, the substantially flat surface of the base portion of the channel member desirably forms an inner surface of the channel member.

This arrangement will allow for a joint compact in the direction measured at the said angle from the surface of the first member.

Additionally, to aid both assembly and rigidity of the joint the first and second elements extending outwardly from the first surface are comprised in a second channel member secured to the first member.

A greater degree of pre-assembly for the joint is thus made possible, also accurate spacing of the first pair of oppositely facing and substantially flat surfaces may more conveniently be achieved.

Conveniently the second channel member is secured at least in part to the first surface of the first member by adhesive bonding. This will provide a joint strong in shear. Additional through fasteners may be used to prevent joint peeling.

According to a second aspect of the invention there is provided an aircraft wing assembly incorporating at least one joint according to the first aspect of the invention in which at least one first said member comprises a wing skin and at least one second said member comprises a wing rib.

In such a design the second channel member and perhaps also the wing skin may comprise fibre reinforced plastics material.

Indeed the invention is particularly suitable for structures in which fibre reinforced plastics material is used owing to the joints ability to absorb manufacturing tolerances which may be particularly prevalent in such structures.

BRIEF DESCRIPTION OF THE DRAWINGS

The invention will now be described by way of example only by reference to the accompanying drawings of which:

FIG. 1 is a side view of an aircraft skin panel including three joints according to the invention in different stages of completion and FIG. 2 is a view in the direction of the Arrow of FIG. 1.

DESCRIPTION OF THE PREFERRED EMBODIMENT

Referring to the drawings a first member in the form of a fibre reinforced composite wing skin panel 1 is shown which comprises a cellular structure and has an outer surface 2 defining an aerodynamic skin profile and an inner first surface 3. The skin panel 1 is comprised in a leading edge structure of the wing, i.e., a structure forward of a front spar (not shown) of the wing.

Because the skin panel 1 is of fibre reinforced composite construction and because of its cellular structure there is potential for manufacturing tolerance of more than one millimeter in directions parallel with the first surface 3 of the wing skin panel and normal to it. The attachment of wing ribs 4 to the panel 1 without complex shimming operations being necessary is therefore important in order to save manufacturing time. These joints according to the invention provide for a connection between the ribs 4 and skin panel 1.

Three second channel members 5 are shown bonded to the first surface 3 of the skin panel. It will be seen that the surface area of each second channel member in contact with the inner first surface of the skin panel is maximised by extensions 6, 7 to the second channel member. Optionally each channel member could be secured, in addition, to the skin panel 1 by through fasteners in order to prevent any tendency for the joint to "peel".

It will be seen from FIG. 1 that first and second elements 8, 9 are pre-drilled to provide a location for further drilling during assembly. Each of the first and second elements 8, 9 has one of a first pair of spaced oppositely facing and substantially flat surfaces 10, 11. The surfaces 10, 11 face each other.

Fitted within the second channel member 5 is a first channel member 12. This has a base portion 13 incorporating a substantially flat inner surface. Extending from the base portion 13 are first and second sidewall portions 15, 16. Each sidewall portion has one of a second pair of oppositely facing surfaces 17, 18, each being adapted slideably to engage one of the first pair of surfaces 10, 11.

The first and second channel members 12, 5 are secured together by a series of bolts 19, 20.

Each rib 4 has a flange 21 having a substantially flat surface 22 thereon adapted to engage the substantially flat inner surface 14 of the first channel member 12. Once again the rib is secured to the first channel member 12 by a series of bolts 23. All the bolts 19, 20, 23 therefore rigidly secure the engageable surfaces 10, 11, 17, 18, 14 and 22 together.

It will be observed that adjustment to take up manufacturing tolerance in the vertical direction is provided by sliding contact between surfaces 10, 11, 17, 18, and that in the horizontal direction is taken up by sliding contact between surfaces 14 and 22.

It will be observed that the joint assembly of the invention provides for an extremely rigid structure and is extremely space efficient in the vertical direction. Because the second channel member 5 is symmetrical any tendency for the joint between the second channel member and the wing skin panel 1 to peel is reduced to a minimum.

In assembly of the joint the second channel member 5 and the flange 21 of the rib 4 are pre-drilled, the pre-drilling acting as a drill locator to drill the first channel member 12 prior to fitting of the bolt.

It will thus be appreciated that the first channel member 12 is in effect a sacrificial member in that holes may be drilled during the assembly process at any location desired using pre-drilled holes in the second channel member 5 and flange 21 of the rib as drill guides. Once the first channel member 12 has been drilled it can be disassembled and fasteners fitted for connecting the joint together.

During maintenance or damage repair operations it may be necessary to refit the ribs 4 to the wing skin and slightly changed tolerances may occur. In this case a fresh first channel member 12 will be employed and redrilled in situ as described above. The first channel member 12 it will be appreciated can be a simple metal extrusion which will be relatively cheap to replace.

We claim:

1. An aircraft joint assembly for connecting together a first member and a second member extending at an angle to a first surface of the first member, said first member comprising an aircraft skin, the joint assembly including:

first and second elements mounted on said first member, each of said elements having one of a first pair of spaced oppositely facing and substantially flat surfaces and extending outwardly from the first surface at substantially said angle, a channel member having a base portion and first and second sidewall portions, each sidewall portion including one of a second pair of oppositely facing surfaces adapted to slidably engage the first pair of surfaces, the base portion including a substantially flat surface facing away from the first surface in use, and a substantially flat surface on the second member adapted to slidably engage said surface of the base portion, the joint being secured by fastening means adapted rigidly to secure said engagable surfaces together.

2. A joint assembly as in claim 1 in which the first pair of spaced, oppositely facing and substantially flat surfaces on the first and second elements of the joint, respectively, face each other.

3. A joint assembly as in claim 2 in which the substantially flat surface of the base portion of the channel member forms an inner surface of the channel member.

4. A joint assembly as in claim 1 in which the first and second elements extending outwardly from the first surface are comprised in a second channel member secured to the first member.

5. A joint assembly as in claim 4 in which the second channel member is secured to the first member at least in part by adhesive bonding.

6. An aircraft wing assembly incorporating at least one joint assembly for connecting together a first member and a second member extending at an angle to a first surface of the first member, the joint assembly including:

first and second elements mounted on said member, each of said elements having one of a first pair of spaced oppositely facing and substantially flat surfaces and extending outwardly from the first surface at substantially said angle, a channel member having a base portion and first and second sidewall portions, each sidewall portion including one of a second pair of oppositely facing surfaces adapted to slidably engage the first pair of surfaces, the base portion including a substantially flat surface facing away from the first surface in use, and a substantially flat surface on the second member adapted to slidably engage said surface of the base portion, the joint being secured by fastening means adapted rigidly to secure said engagable surfaces together, in which at least said first, member comprises a wing skin and at least said second member comprises a wing rib.

7. An aircraft wing assembly as in claim 6 in which the second channel member is secured to the first member at least in part by adhesive bonding and comprises fibre reinforced plastics material.

8. An aircraft wing assembly as in claim 6 in which the wing skin comprises fibre reinforced plastics material.

* * * * *